US008716947B2

(12) United States Patent
Elder

(10) Patent No.: US 8,716,947 B2
(45) Date of Patent: May 6, 2014

(54) LED CURRENT SOURCE DIGITAL TO ANALOG CONVERTOR

(75) Inventor: Joseph Scott Elder, Chandler, AZ (US)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 13/311,037

(22) Filed: Dec. 5, 2011

(65) Prior Publication Data

US 2012/0286685 A1 Nov. 15, 2012

Related U.S. Application Data

(60) Provisional application No. 61/486,202, filed on May 13, 2011.

(51) Int. Cl.
*H05B 37/02* (2006.01)

(52) U.S. Cl.
USPC .......................................... 315/224; 315/307

(58) Field of Classification Search
USPC ................................................ 315/224, 307
See application file for complete search history.

(56) References Cited

U.S. PATENT DOCUMENTS

| 7,808,284 | B2 * | 10/2010 | Tanaka | 327/108 |
| 7,977,890 | B2 * | 7/2011 | Kumagai | 315/247 |
| 8,410,716 | B2 * | 4/2013 | Yao et al. | 315/291 |
| 2004/0164685 | A1 * | 8/2004 | Dygert | 315/224 |
| 2004/0239654 | A1 * | 12/2004 | Okuda | 345/204 |
| 2006/0055465 | A1 * | 3/2006 | Lin et al. | 330/288 |
| 2009/0195191 | A1 * | 8/2009 | Lin et al. | 315/307 |
| 2009/0225014 | A1 * | 9/2009 | Ikegami | 345/82 |
| 2010/0194301 | A1 * | 8/2010 | Okubo | 315/224 |
| 2010/0219766 | A1 * | 9/2010 | Kuo et al. | 315/224 |
| 2010/0219773 | A1 * | 9/2010 | Nakai | 315/307 |

OTHER PUBLICATIONS

Texas Instruments; "1.5A/4.1A Multiple LED Camera Flash Driver with I2CTM Compatible Interface"; Jun. 2009, Revised Sep. 2010.

* cited by examiner

*Primary Examiner* — Jason M Crawford

(57) ABSTRACT

Various embodiments relate to a method of producing a high precision current using N current mirrors, a feedback control amplifier, and a reference current regulator to drive a light emitting diode, including: selecting one of the N current mirrors as a first current mirror; driving the first current mirror using a reference current produced by the reference current regulator; measuring a first sense voltage at the first current mirror; measuring a second sense voltage at a second current mirror that is one of the remaining N−1 current mirrors; integrating a difference of the first sense voltage and the second sense voltage to produce a feedback signal; and driving the remaining N−1 current mirrors using the feedback signal.

21 Claims, 3 Drawing Sheets

LED CURRENT SOURCE DIGITAL TO ANALOG CONVERTOR

TECHNICAL FIELD

Various exemplary embodiments disclosed herein relate generally to a light emitting diode (LED) current source digital to analog converter.

BACKGROUND

LEDs (Light Emitting Diodes), especially high brightness LEDs, may be used as flash light sources to illuminate scenes for photography or videography. When used for flash photography these LEDs may operate by converting very high currents from a current source into white light for very brief periods of time, for example, on the order of a few hundred milliseconds or less. The ability to control the variance of the high current accuracy with a small compliance voltage across the current source may be critical for power efficiency when used in battery driven applications.

A traditional current source is required to produce a large current, but there may be a desire to minimize the losses in producing this large current by reducing the voltage drop across a driving transistor and an output resistor. This leads to a very low resistance output resistor that becomes very expensive to achieve the required accuracy of the resistance value. Further, such a current source will have large variations due to changes in temperature. These challenges make it difficult and expensive to try to produce a high precision high current with such a current source.

SUMMARY

Accordingly, there is a need for a high precision current source capable of producing large currents. An embodiment described in further detail below includes a large number of current sources in parallel to produce a high precision large current. Because each individual current source produces a small current, the precision of that current may be easily controlled.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may also relate to a method of producing a high precision current using N current mirrors, a feedback control amplifier, and a reference current regulator to drive a light emitting diode, including: selecting one of the N current mirrors as a first current mirror; driving the first current mirror using a reference current produced by the reference current regulator; measuring a first sense voltage at the first current mirror; measuring a second sense voltage at a second current mirror that is one of the remaining N−1 current mirrors; integrating a difference of the first sense voltage and the second sense voltage to produce a feedback signal; and driving the remaining N−1 current mirrors using the feedback signal.

Various embodiments may also relate to a light emitting diode current source, including: a modulator control logic that produces N control signals including a first control signal; a modulated current source including: N current mirrors including a first current mirror; a reference current generator that provides a reference current to the N current mirrors; and a feedback control amplifier that produces a feedback signal to drive the current mirrors; wherein the first control signal connects the first current mirror to the feedback control amplifier and applies the reference current to first current mirror.

Various embodiments may also relate to a method of producing a high precision current using N current mirrors, a feedback control amplifier, and a reference current regulator to drive a light emitting diode, including: selecting one of the N current mirrors as a first current mirror; driving the first current mirror using a reference current produced by the reference current regulator; measuring a first sense voltage at the first current mirror; holding the first sense voltage; driving the first current mirror using a feedback signal; measuring a second sense voltage at the first current mirror; integrating a difference of the first sense voltage and the second sense voltage to update the feedback signal; and driving the remaining N−1 current mirrors using the feedback signal.

BRIEF DESCRIPTION OF THE DRAWINGS

In order to better understand various exemplary embodiments, reference is made to the accompanying drawings wherein.

DETAILED DESCRIPTION

Figure 1:
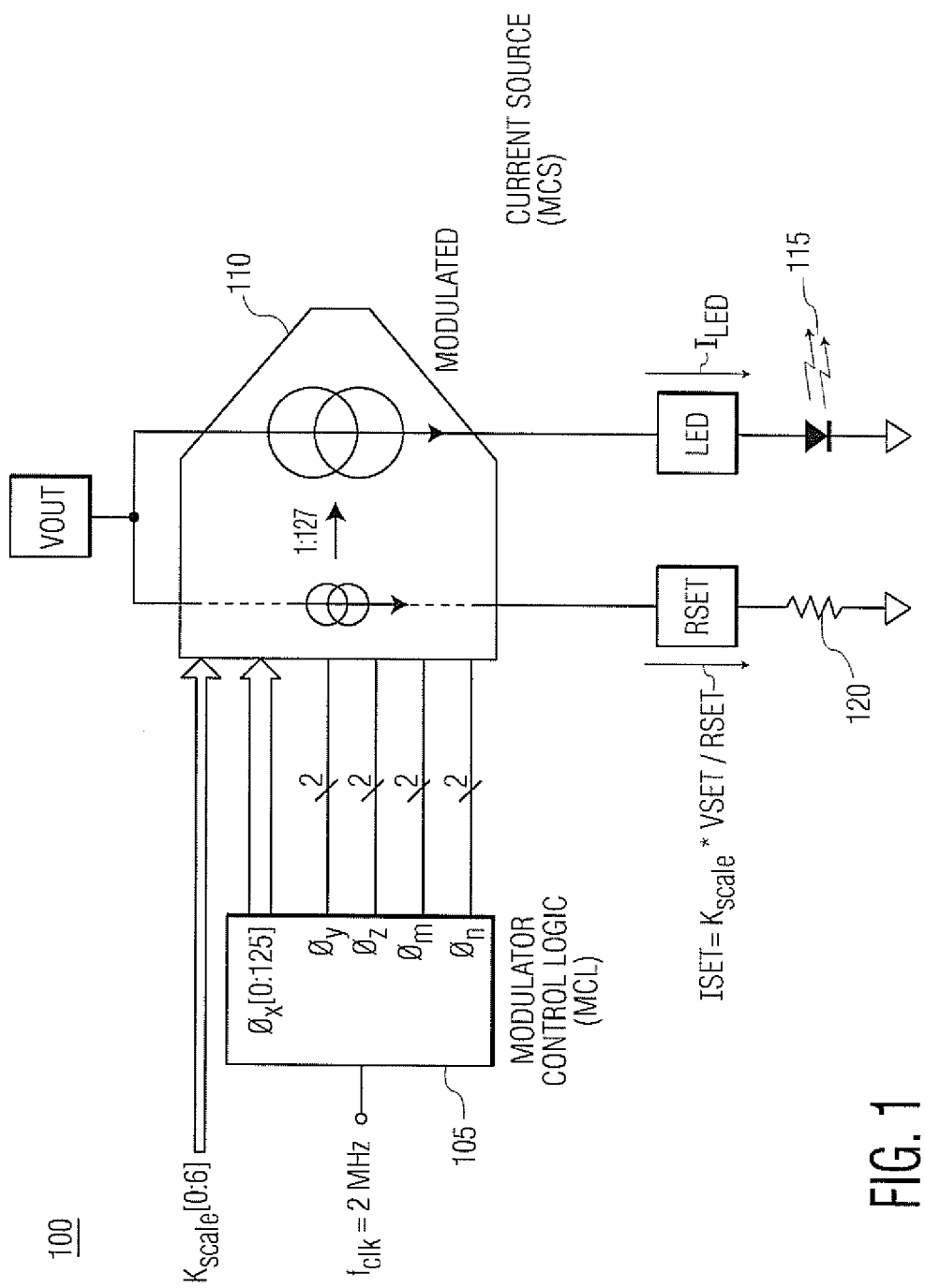
FIG. 1 is a block diagram illustrating an embodiment of a digital to analog converter (DAC) current source.

Referring now to the drawings, in which like numerals refer to like components or steps, there are disclosed broad aspects of various exemplary embodiments.

FIG. 1 is a block diagram illustrating an embodiment of a digital to analog converter (DAC) current source. The DAC current source 100 may include a modulated current source (MCS) 110 and modulator control logic (MCL) 105. The DAC current source 100 may be connected to the LED 115 and a reference resistor 120 with a resistance value of RSET.

The MCS 110 may include 128 current mirrors in parallel that combine to produce an LED current LED. While 128 current mirrors are used as an example in this embodiment, any other number of current mirrors may be used as well. The MCS light emitting diode (LED) output current may be defined as:

$$I_{LED} = \Sigma_{x=0}^{126} I_{L,x} + 0 \cdot I_{L,y}, \quad (1)$$

where $I_{L,x}$=the output current of $M(I_L)_x$ and $I_{L,y}$=the output current of $M(I_L)_y$. The subscript y in the preceding equation may be determined by the MCL 105 and may be based upon a decoded random number generated by a multi-bit linear feedback shift register (LFSR) that will be describer further below. The equation for $I_{LED}$ indicated that the output LED current sourced into the LED pad is comprised of 127 out of a possible 128 current mirror devices because a sequentially randomly selected $M(I_L)_y$ is always turned off. Consequently, the $I_{L,y}$ contributions to the composite current are always zero.

The MCS 110 may have the requirement for a precise controlled LED current source that may operate with a very small compliance voltage (i.e., 0.3V) at very high currents (i.e., 1.5 A). Whereas a traditional precision current source may utilize a single sense resistor in a closed loop, the MCS 110 employs a distributed sensing resistance. It is the sum of all of the current sensing error terms across R (sense)$_x$ that may constitute the feedback error signal.

For example, consider that for power efficiency reasons the LED current source must be capable of sourcing 1.5 A with a compliance voltage of less than 0.3V. This is equivalent to a composite current mirror transistor whose RDS$_{on}$ is less than about 0.2Ω. To sense current in the source of such a device while maintaining the required power efficiency means that the sense resistor must be roughly 20 mΩ and the FET area must be 11% larger. In the case of an LED flash application, the current mirror FET may easily consume 30% of the die area. Therefore the die area would increase by at least 3%, but, it may be more important to consider the precision requirements.

It may be impractical to build a precision 20 mΩ sense resistor on an IC. First, such a small valued resistor would most likely be a metal resistor. Metal resistors have large temperature coefficients (i.e. 3000 ppm/° C.) that add to the error of the output current. Second, the distributed nature of a 0.2Ω FET means that uniform current flow must be managed and sensed across a single wide metal segment (i.e., 300 μm) during huge transient die temperature gradients. Accordingly, an alternative solution may be required such as the current embodiment of the MCS 110.

Figure 2:
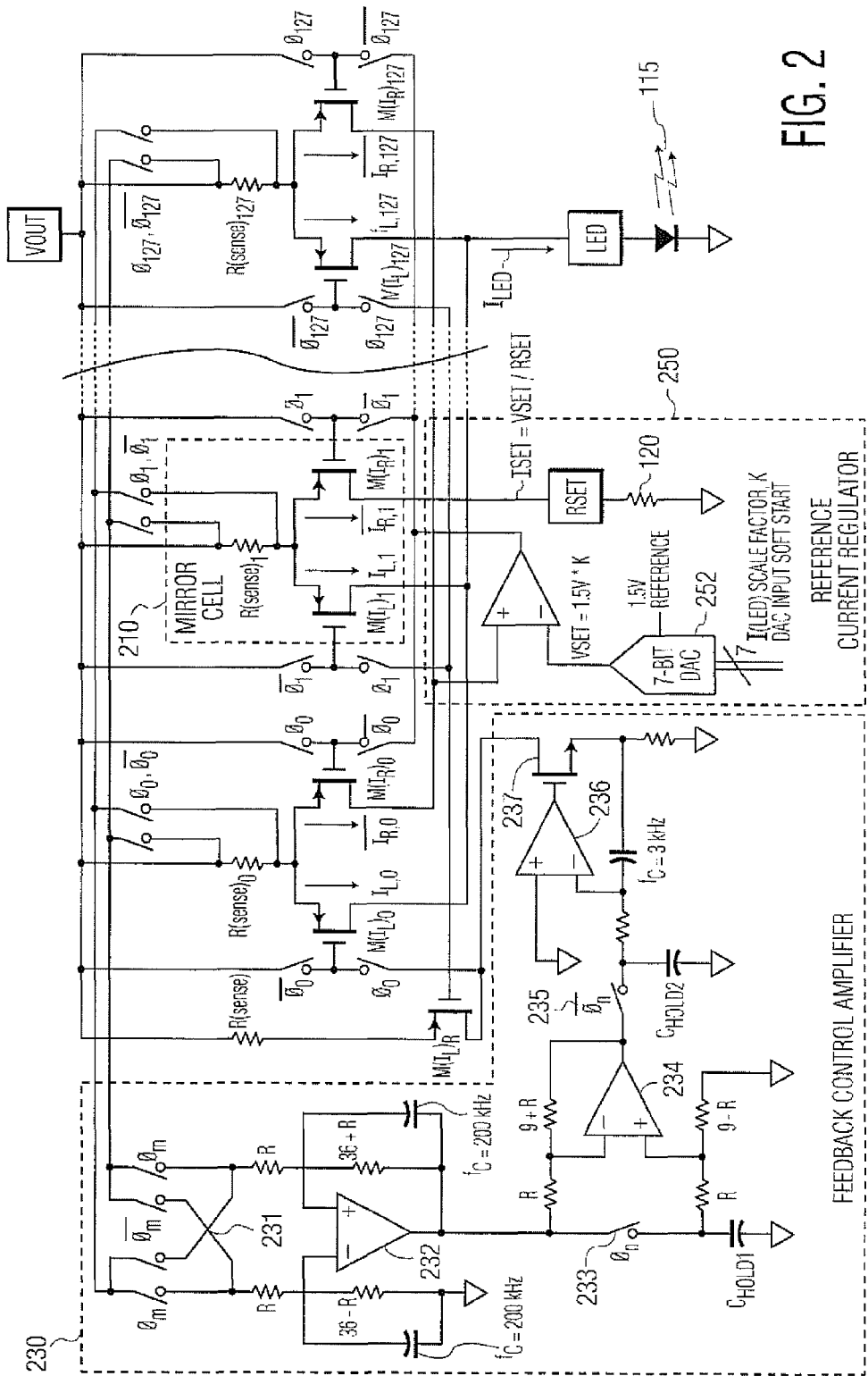
FIG. 2 is a circuit diagram of a modulated current source.

FIG. 2 is a circuit diagram of the MCS 110. The MCS as shown in FIG. 2 may include 128 individual mirror cells 210, a feedback control amplifier 230, and a reference current regulator 250 that produces the reference current I$_{SET}$. Once a control loop in the feedback control amplifier 230 has settled, a mirrored reference current may be established through the diode-connected reference device M(I$_L$)$_R$. At any one time only 127 of the 128 mirror cells 210 may be enabled to produce the LED output current I$_{LED}$ as mathematically expressed in Equation 1. During that time, the feedback control amplifier 230 may be measuring the current of the excluded mirror cell 210 relative to a desired reference current value I$_{SET}$. It may take 128 cycles of sampling, one cycle for each mirror cell 210, to build a composite error signal for the entire MCS 110.

The reference current I$_{SET}$ is equal to the voltage at the RSET pin divided by the resistance RSET of the reference resistor 120. The voltage at the RSET pin is established by controlling the output voltage of a 7-bit DAC 252 of the reference current regulator 250. The input to the 7-bit DAC 252 may be a 7-bit scale factor that operates as a multiplier on a 1.5V reference voltage, but other values for the reference voltage may used as well. In normal operation, V$_{SET}$ may be 1.25V—decimal 107 at first power on. But the purpose behind the DAC 252 may be to dynamically adjust the input value up or down based upon the forward voltage of the external LED 115 connected to the LED pin.

It may be necessary to control the power dissipated on the LED 115 to maintain adequate lifetime with the appropriate amount of lumens emitted. Power translates into LED 115 junction temperature. High junction temperatures reduce lifetime and lumen output.

Each mirror cell 210 may include: (a) one LED output transistor, M(I$_L$)$_x$, (b) one reference current transistor, M(I$_R$)$_x$, and (c) one metal sense resistor R (sense)$_x$ that may have a resistance of approximately 4Ω, but other resistance values may be used as well. Based upon the output states of the MCL 105, each mirror cell 210 operates in one of two possible modes: (mode-L) where M(I$_L$)$_x$ is on and M(I$_R$)$_x$ is off or (mode-R) where M(I$_L$)$_x$ is off and M(I$_R$)$_x$ is on.

When a mirror cell 210 is one of the 127 mirror cells used to produce I$_{LED}$, it may be operating in mode-L, and the remaining or excluded mirror cell 210 may be in mode-R. One of the mirror cells in mode-L may serve as a dummy mirror cell 210 for use as a swap device when the excluded mirror cell 205 may be cycled from mode-R to mode-L. That is, as the excluded mirror cell 210 is cycled from mode-R to mode-L, the dummy mirror cell 210 may be swapped from mode-L to mode-R. The mirror cell operating modes and swap device functionality may be managed by MCL 105 control signals.

The MCL 105 may generate control signals that may be output on five output control signal busses: φ$_m$[0:1], φ$_n$[0:1], φ$_x$[0:251], φ$_y$[0:1], and φ$_z$[0:1]. Bus φ$_m$[0:1] may include two wires which may be complements of each other and will be referred to hereafter as signal φ$_m$. Bus φ$_n$[0:1] may include two wires which may be complements of each other and will be referred to hereafter as signal φ$_n$.

Busses φ$_x$[0:251], φ$_y$[0:1], and φ$_z$[0:1] may form one composite bus of 128×2 wires where a first set of 1×2 wires may carry the φ$_y$ information state, a second set of 1×2 wires may carry the φ$_z$ information state and the remaining 126×2 wires may carry the co, information state. Hereafter, these busses will be referred to as φ$_x$, φ$_y$, or φ$_z$. A phase generator manages the assignment of information states to the mirror cells 210.

To simplify the circuit diagram in FIG. 2, each mirror cell 210 may be shown as being controlled by one set of control signals with a fixed subscript value. Despite this simplification, it should be understood, for example, that φ$_0$ might receive the φ$_x$, φ$_y$, or φ$_z$ signal depending upon whether the MCL 105 assigns φ$_x$, φ$_y$, or φ$_z$ signal to mirror cell 0. During each 128-cycle process, each mirror cell 210 may receive the φ$_y$ signal once, the φ$_z$ signal once, and the φ$_x$ signal for the remaining 126 cycles.

The MCL signal φ$_m$ may control whether the gain of the first differential amplifier in the feedback control amplifier is positive or negative.

The MCL signal φ$_n$ may control whether the first mode voltage is being sampled and held when φ$_n$ is true, or the mode voltage difference is being sampled and held when φ$_n$ is false. The first mode voltage may be either +mode-L or −mode-R based and may be determined by the state of φ$_m$.

The composite signal bus of φ$_x$, φ$_y$, or φ$_z$ controls the conversion of mode-L and mode-R signal voltages that are dropped across R(sense)$_y$ into a series of time sampled error signals where each error signal is equivalent to {v(mode-L)−v(mode-R)}$_y$.

When the MCS 110 is operational, the voltage drops across R(sense)$_y$ may be on the order of 20 mV. It may be desirable to control the output current I$_{LED}$ to within 2%. Half of the 2% error may be attributed to I$_{SET}$ and results from absolute voltage errors in the 1.5V reference and the integral linearity of the 7-bit DAC. Consequently the feedback control system may manage the remaining errors to be less than 1%.

One percent of 20 mV is about 200 uV. Therefore managing noise in the feedback signal may be very important. Accordingly, the sampling order of mode-L and mode-R voltages may be randomized by the MCL 105 so that correlated sampling errors are fed back while other deterministic noise sources are rendered white and then filtered from the feedback.

The feedback control amplifier 230 may include a input switching network 231, a sampling amplifier 232, a sampling switch 233, an error signal amplifier 234, an error signal sampling switch 235, and integration amplifier 236, and an output transistor 237 that serves as a voltage to current translator. The input switching network 231, sampling amplifier 232, sampling switch 233 and C$_{hold1}$ form a sampling circuit that samples a voltage applied to the feedback control amplifier 230 from the mirror cells and holds that voltage on C$_{hold1}$.

Then, the sampling switch 233 opens isolating the held voltage so that a second voltage from the current mirror may be received. The second voltage will be given a different polarity from the first voltage by toggling the input switching network 231. This causes the first and second voltages to be applied to the input of the error signal amplifier 234. The error signal amplifier 234 is part of an error signal circuit that produces an output signal indicating the difference between the two input signals. The output of the error signal amplifier 234 may then be held on a second capacitor $C_{hold2}$ by opening the error signal switch 235. The voltage on $C_{hold2}$ may then be integrated by the integration amplifier 236 to produce a feedback signal. The integration amplifier 236 may be a part of an integration circuit. The output of the integration amplifier 236 may be applied to the gate of an output transistor 237 that provides the feedback current signal to the current mirrors 210. While the control loop electronics are shown using continuous time amplification, it may be preferable to build such circuits using sampled data techniques such as switched capacitor amplifiers and integrators to minimize the feedback error terms and thereby increase the precision control of the DAC output current.

Figure 3:
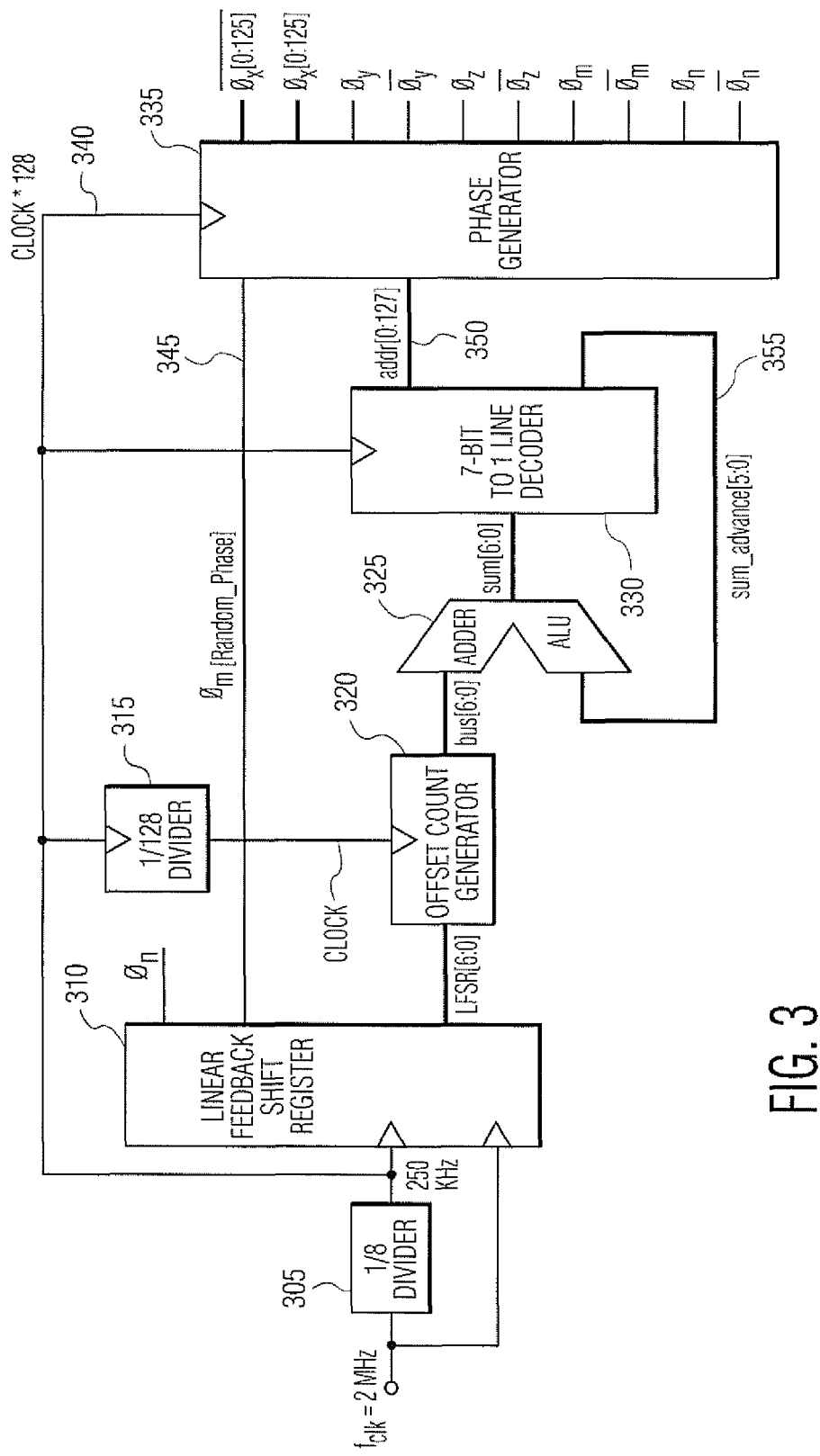
FIG. 3 is a block diagram illustrating a current source modulator control logic.

FIG. 3 is a block diagram illustrating the current source modulator control logic. To affect the random modulation of the mirror cells 210 the MCL 105 may include a multi-bit linear feedback shift register (LFSR) 310, an offset counter generator 320, an arithmetic logic unit (ALU) 325, a 7-bit to one line decoder 330, and a phase generator 335 that applies the $\phi_x$, $\phi_y$, or $\phi_z$ signals to each member of the 128×2 control bus.

As shown in FIG. 3, the MCL phase generator receives three control inputs: (a) clock*128 340, (b) random_phase 345, and a 128 wire bus 350.

The input clock*128 340 may be a division by eight of the analog system clock $f_{clk}$. In FIG. 3 the absolute rate of clock*128 340 may be 250 KHz. The clock rate may be set based upon the settling time of the feedback control amplifier. The LFSR 310 and 7-bit to 1 line decoder 330 may be advanced every cycle of clock*128 340.

For every advance of the LFSR 310, the state of $\phi_m$ may change. The state of $\phi_m$ may equal the feedback input to the LFSR 310. As such, $\phi_m$ may be a random bit stream with a state change at half the rate of clock*128 340. Despite being random, the output of LFSR 310 may repeat itself every $2^k-1$ cycles of clock*128 340 where k equals the number of registers in the LFSR 310.

To avoid system visual or audible artifacts, the LFSR 310 random sequence may be designed not to repeat but once every few seconds. At a clock rate of 250 Khz, there are 250,000 advances of the LFSR every second. Therefore, k should be at least 18. Consequently, an initial design value for k may be chosen to be 24. Additionally, division factors other than 8 are acceptable, but k must always be an even integer.

As a consequence of the bus 350 being driven by a random pattern, the phase generator 335 may randomly assign the $\phi_x$, $\phi_y$, or $\phi_z$ control signals to the 128 mirror cells 210. This randomization process proceeds as described below.

The bus 350 indicated to the phase generator 335 which one of 128 mirror cells 210 may receive the $\phi_y$ control signal. The immediately adjacent mirror cell then may receive the $\phi_z$ signal. All other mirror cells 210 receive the $\phi_x$ control signal.

The 126 mirror cells 210 that receive $\phi_x$ control signal may be statically enabled to connect their $M(I_L)_x$ transistors to the composite $I_{LED}$ output signal wire for both phases of $\phi_m$. All $M(I_R)_x$ may be disabled.

If the state of $\phi_m$ is high at the rising edge of clock*128 340, the decoded output on bus 350 may be modulated by $\phi_y$ and is also high. With the convention described earlier, this means that $M(I_L)_y$ may be enabled and connected to the $I_{LED}$ output signal wire, and $M(I_R)_z$ may be enabled as a dummy current sink for $I_{SET}$. Additionally, $M(I_R)_y$ and $M(I_L)_z$ may be disabled. During this phase of $\phi_m$, the feedback control amplifier may be sampling $I_{L,y}$ across $R(sense)_y$.

If the state of $\phi_m$ is low at the rising edge of clock*128 340, the decoded output on bus 350 may be modulated by $\phi_y$ and is also low. With the convention described earlier, this means that $M(I_R)_y$ may be enabled as the current sink for $I_{SET}$ and $M(I_L)_z$ may be enabled and connected to the $I_{LED}$ output signal wire. Additionally, $M(I_L)_y$ and $M(I_R)_y$ may be disabled. During this phase of $\phi_m$, the feedback control amplifier may sampling $I_{L,y}$ across $R(sense)_y$.

The reason that $M(I_L)_z$ and $M(I_R)_y$ may be considered dummy devices is that they serve as temporary current holding paths while the currents through the sampled mirror cell transistors transition between mode-L and mode-R. These dummy paths may help maintain a fixed external current flow to minimize MCS 110 modulation artifacts showing up in the power source or load of the MCS 110 (i.e., LED 115). If the dummy devices did not exist, every time that a mirror cell 210 was operating in mode-L, the reference current regulator 250 may saturate without a sink path for the current. And every time that the mirror cell 210 was operating in mode-R, the LED output current would have 1 segment of 127 current mirror segments dropped. Accordingly, there may be pulsed current into the LED albeit only 1 part of 127 (i.e., 40 dB down).

By utilizing the dummy devices, the modulation artifacts may be limited to the difference between the two currents. In the case of the $M(I_R)_y$ and $M(I_R)_y$ swaps, there may be essentially no difference except the transition time noise. In the case of the $M(I_L)_z$ and $M(I_L)_y$ swaps, there may be typically less than 5% difference or a 26 dB reduction in the modulation noise seen at both the power source input and LED output.

From a logic equivalency standpoint one may deduce that $\phi_z$ may be merely a complement of $\phi_y$. While this may be true, the physical implementation may need to manage this aspect differently than shown in FIG. 2 as a result of the block diagram simplifications.

The remaining blocks of the MCL 105 may be the offset count generator (OCG) 320 and ALU 325. The OCG 320 may receive as an input 7 bits from the LSFR 310. These bits may form a random number between 0 and 127. The output of the OCG 320 may be equal to the next sequential odd integer above the random input number with one exception; the number may not be 127. The reason for the restrictions on output of the OCG 320 has to do with the operation of the ALU.

Logically, the OCG 320 output requirement may be met by simply or-ing the input word LFSR [6:0] with a logic 1 unless the word equals 126. The LFSR 310 may be designed such that decimal 126 may never be an input to the OCG 320. This maybe done a number of ways.

For example, a look-ahead decoder may constantly monitor the pending next 7-bit value coming from the LFSR 310. If that should be a 126, a separately running 7 bit sequential counter may be used as the output value. When designing the LFSR 310, this method may be studied to assess the occurrence probability for each of the 63 odd numbers possible. The result should be uniform.

Note that the LFSR 310 may receive two input clocks. The purpose for two clocks may be to shift the internal registers by 7 shifts once every cycle of the 250 KHz clock. This ensures that the sequential 7 bit numbers may not be deterministic;

that is, each bit of each successive 7 bit number output from the LFSR 310 has had any opportunity to be altered.

The ALU 325 may be essentially just a cyclical adder. The input is the odd random number from the OCG 320 which them may simply be added to itself for every cycle of clock*128 340. When odd numbers are added, each decimal number from 0 to 127 may be produced at the output: sum_advance [6:0]. The bus sum_advance 355 may be decoded internally to the 7-bit to 1 line decoder to produce the addr [0:127] encoding on bus 350.

As a consequence of the above process, the MCL 105 may ensure that the mismatch of all mirror cells 210 may be processed through the feedback control amplifier 230 once every 128 cycles.

While a specific structure has been disclosed to produce random numbers in the MCL 105, other structures and methods may be used as well.

In a second embodiment, a single current mirror may be driven in mode-R and then measured. Next, the same current mirror may be driven in mode-L and measured. A difference between these measurements may be used by the feedback control amplifier 230 to provide feedback to the current mirrors 210. One difference, between the second and the first embodiment, is that the second embodiment will take twice as many sampling cycles to sample each of the current mirrors 210 because it takes two cycles to determine the difference signal.

In a third embodiment, rather than measuring a first voltage across a sense resister in a first current mirror and measuring a second voltage across a sense resister in a second current mirror as in the first embodiment, a voltage is measured between two nodes in the first and second current mirrors. The nodes are between the sense resistor and the drive transistor in the current mirrors 210. This provides the difference voltage directly without having to take the difference of two separate voltage measurements because all of the sense resistors have a node attached to a common voltage.

Accordingly, the embodiments describe above may produce a user programmable and predictable precision current that may be used to drive an external HBLED connected to the LED pin. Further, the system noise present on top of that precision current signal may be small in amplitude and substantially white.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A method of producing a high precision current using N current mirrors, a feedback control amplifier, and a reference current regulator to drive a light emitting diode, comprising:
   selecting one of the N current mirrors as a first current mirror;
   driving the first current mirror using a reference current produced by the reference current regulator;
   measuring a first sense voltage at the first current mirror;
   measuring a second sense voltage at a second current mirror that is one of the remaining N−1 current mirrors;
   integrating a difference of the first sense voltage and the second sense voltage to produce a feedback signal; and
   driving the remaining N−1 current mirrors using the feedback signal.

2. The method of claim 1, further comprising:
   driving the second current mirror using the reference current;
   measuring a third sense voltage at the second current mirror;
   driving the first current mirror using the feedback signal;
   measuring a fourth sense voltage at the first current mirror; and
   integrating a difference of the third sense voltage and the fourth sense voltage to update the feedback signal.

3. The method of claim 1, wherein the selected first current mirror and the second current mirrors are adjacent to one another.

4. The method of claim 1, the first current mirror is selected randomly.

5. The method of claim 1, wherein the steps of selecting the first current mirror, driving the first current mirror, measuring a first sense voltage, measuring a second sense voltage, integrating a difference, and driving the remaining N−1 current mirrors are repeated.

6. The method of claim 1, wherein the steps of selecting the first current mirror, driving the first current mirror, measuring a first sense voltage, measuring a second sense voltage, integrating a difference, and driving the remaining N−1 current mirrors are repeated N−1 times.

7. The method of claim 6, wherein the first current mirror is selected randomly without selecting the same current mirror twice.

8. A light emitting diode current source, comprising:
   a modulator control logic that produces N control signals including a first control signal;
   a modulated current source including:
      N current mirrors including a first current mirror;
      a reference current generator that provides a reference current to the N current mirrors; and
      a feedback control amplifier that produces a feedback signal to drive the current mirrors;
   wherein the first control signal connects the first current mirror to the feedback control amplifier and applies the reference current to first current mirror.

9. The light emitting diode current source of claim 8, wherein the modulator control logic includes a phase generator that produces the first control signal that randomly selects the first current mirror based upon an output from a linear feedback shift register.

10. The light emitting diode current source of claim 9, wherein the linear feedback shift register sequentially produces N first control signals, wherein the N first control signals select each of the N current mirrors once.

11. The light emitting diode current source of claim 8, wherein phase generator generates a second control signal, N−2 third control signals, a fourth control signal, and a fifth control signal, wherein the second control signal is applied to a second current mirror and the N−2 third control signals are applied to the remaining N−2 current mirrors.

12. The light emitting diode current source of claim 11, wherein the fourth control signal controls a gain in the feedback control amplifier to be positive or negative.

13. The light emitting diode current source of claim 11, wherein the fifth control signal controls whether a first mode voltage or a mode voltage difference is being sampled by the feedback control amplifier.

14. The light emitting diode current source of claim 11, wherein the second current mirror is adjacent to the first current mirror.

15. The light emitting diode current source of claim 8, wherein the feedback control amplifier includes a sample and hold circuit, an error signal circuit, and an integrator circuit.

16. The light emitting diode current source of claim 8, wherein each current mirror includes:
- a sense resistor that is used to sense current following through the current mirror;
- an output transistor that outputs current to the light emitting diode; and
- a reference current transistor,
- wherein the output transistor and the reference transistor are driven by complementary control signals.

17. The light emitting diode current source of claim 16, wherein a voltage across the sense resistor is transmitted to the feedback control amplifier.

18. A method of producing a high precision current using N current mirrors, a feedback control amplifier, and a reference current regulator to drive a light emitting diode, comprising:

- selecting one of the N current mirrors as a first current mirror;
- driving the first current mirror using a reference current produced by the reference current regulator;
- measuring a first sense voltage at the first current mirror;
- holding the first sense voltage;
- driving the first current mirror using a feedback signal;
- measuring a second sense voltage at the first current mirror;
- integrating a difference of the first sense voltage and the second sense voltage to update the feedback signal; and
- driving the remaining N−1 current mirrors using the feedback signal.

19. The method of claim 18, the first current mirror is selected randomly.

20. The method of claim 18, wherein the steps of selecting the first current mirror, driving the first current mirror using a reference current, measuring a first sense voltage, holding the first sense voltage, driving the first current mirror using a feedback signal, measuring a second sense voltage, integrating a difference, and driving the remaining N−1 current mirrors are repeated N−1 times.

21. The method of claim 20, wherein the first current mirror is selected randomly without selecting the same current mirror twice.

\* \* \* \* \*